US009614580B2

United States Patent
Shih et al.

(10) Patent No.: US 9,614,580 B2
(45) Date of Patent: Apr. 4, 2017

(54) NETWORK DEVICE WITH FREQUENCY HOPPING SEQUENCES FOR ALL CHANNEL-NUMBERS FOR CHANNEL HOPPING WITH BLACKLISTING

(71) Applicant: Texas Instruments Incorporated, Dallas, TX (US)

(72) Inventors: Chao-Fang Shih, Smyrna, GA (US); Ariton E. Xhafa, Plano, TX (US); Jianwei Zhou, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/993,552

(22) Filed: Jan. 12, 2016

(65) Prior Publication Data
US 2016/0204827 A1 Jul. 14, 2016

Related U.S. Application Data

(60) Provisional application No. 62/102,322, filed on Jan. 12, 2015, provisional application No. 62/130,194, filed on Mar. 9, 2015.

(51) Int. Cl.
*H04B 1/00* (2006.01)
*H04B 1/7143* (2011.01)

(52) U.S. Cl.
CPC .................. *H04B 1/7143* (2013.01)

(58) Field of Classification Search
None
See application file for complete search history.

(56) References Cited

U.S. PATENT DOCUMENTS

| 7,318,010 | B2 | 1/2008 | Anderson |
| 7,979,096 | B1 | 7/2011 | Elliott et al. |
| 8,335,244 | B2 * | 12/2012 | Liu ........................ H04B 1/713 |
| | | | 375/132 |
| 8,995,380 | B2 | 3/2015 | Choi et al. |
| 9,148,197 | B1 * | 9/2015 | Hartman .............. H04B 1/7143 |
| 9,172,517 | B2 | 10/2015 | Xhafa et al. |
| 2005/0122231 | A1 | 6/2005 | Varaiya et al. |

(Continued)

OTHER PUBLICATIONS

Du et al., "Spectrum-Aware Wireless Sensor Networks," 2013 IEEE 24th Int'l Symp. on Personal, Indoor and Mobile Radio Communications: Mobile and Wireless Networks, pp. 2321-2325.

(Continued)

*Primary Examiner* — Shuwang Liu
*Assistant Examiner* — Gina McKie
(74) *Attorney, Agent, or Firm* — John R. Pessetto; Charles A. Brill; Frank D. Cimino

(57) ABSTRACT

Disclosed examples include methods and network devices for communicating in a wireless network, in which the device generates frequency hopping sequence y(j) having a prime number sequence length p, using cyclotomic classes in a field of p or using a baby-step giant-step algorithm, where y(0)=p−1 and the remaining sequence values y(j) =log$_\alpha$(j) mod (p−1). In certain examples, α=2 and the sequence is generated without solving logarithms using one or more algorithms to conserve memory and processing complexity for low power wireless sensors or other IEEE 802.15.4e based networks using Time-Slotted Channel Hopping (TSCH) communications.

20 Claims, 3 Drawing Sheets

(56) References Cited

U.S. PATENT DOCUMENTS

2007/0019594 A1 1/2007 Perumal et al.
2016/0072548 A1* 3/2016 Shih .................... H04B 1/7143
　　　　　　　　　　　　　　　　　　　　　375/134

OTHER PUBLICATIONS

IEEE Standard for Local and Metropolitan Area Networks, Part 15.4: Low-Rate Wireless Personal Area Networks (LR-WPANS), Amendment 1: MAC Sublayer, IEEE Computer Society; IEEE Std 802.15.4e-2012 (Amendment to IEEE Std 802.15.4-2011), Apr. 16, 2012, 255 pgs. (uploaded to the USPTO website in 2 parts).
Lempel et al., "Families of Sequences with Optimal Hamming Correlation Properties," IEEE Transactions on Information Theory, vol. IT-20, No. 1, Jan. 1974, pp. 90-94.
Chu et al., "Optimal Frequency-Hopping Sequences Via Cyclotomy," IEEE Transactions on Information Theory, vol. 51, No. 3, Mar. 2005, pp. 1139-1141.
Texas Instruments, "CC2650 SimpleLink Multistandard Wireless MCU", CC2650 SWRS15—Feb. 2015, 52 pgs.
IEEE Standard for Local and Metropolitan Area Networks, Part 15.4: Low-Rate Wireless Personal Area Networks (LR-WPANS), IEEE Computer Society; IEEE Std 802.15.4e-2011 (Revision of IEEE Std 802.15.4.2006), Sep. 5, 2011, pp. 1-294. (uploaded to the USPTO website in 3 parts).
Shih et al., "Practical Frequency Hopping Sequence Design for Interference Avoidance in 802.15.4e TSCH Networks", IEEE International Conference on Communications (ICC) Networks, Jun. 8-12, 2015, pp. 6494-6499.

* cited by examiner

NETWORK DEVICE WITH FREQUENCY HOPPING SEQUENCES FOR ALL CHANNEL-NUMBERS FOR CHANNEL HOPPING WITH BLACKLISTING

REFERENCE TO RELATED APPLICATION

Under 35 U.S.C. §119, this application claims priority to, and the benefit of, U.S. provisional patent application No. 62/102.322, entitled "FREQUENCY HOPPING SEQUENCES FOR ALL CHANNEL-NUMBERS FOR CHANNEL HOPPING WITH BLACKLISTING", filed on Jan. 12, 2015, and this application further claims priority to, and the benefit of, U.S. provisional patent application No. 62/130,194, entitled "FHS ALGORITHMS WITH BLACKLISTING IN WIRELESS NETWORKS", filed on Mar. 9, 2015, the entirety of which applications are hereby incorporated by reference.

Reference is made to copending U.S. patent application Ser. No. 14/813,093, entitled "Techniques for Generation of a Frequency Hopping Sequence", filed on Jul. 29, 2015 (Attorney Docket number TI-75449), which claims priority to U.S. provisional application No. 62/048,692 filed on Sep. 10, 2014, the entireties of which applications are hereby incorporated by reference.

TECHNICAL FIELD

The present disclosure relates generally to wireless sensors, and more particularly to low power wireless devices using channel hopping sequences.

BACKGROUND

IEEE 802.15.4e is an enhanced media access control (MAC) layer protocol of IEEE 802.15.4 designed for low power and low rate networks, and suitable for sensor devices with resource constraints such as low power consumption, low computation capabilities, and/or low memory. The IEEE 802.15.4 protocol supports Time-Slotted Channel Hopping (TSCH), in which network nodes or devices are time-synchronized to a root node in the network and individual device use time slots to communicate and synchronize in the network. The device hops among all channels according to a frequency hopping sequence (FHS) during the time slots. TSCH can achieve higher capacity and provides finer granularity for power savings in IEEE 802.15.4e networks. The network device power consumption increases with increased channel interference due to more frequent packet retransmissions compared to situations where there is no interference. TSCH with channel blacklisting is proposed for IEEE 802.15.4e based networks to decrease the power consumption due to interference by temporarily avoiding the use of channels that are observed to be heavily interfered. Since some channels are "blacklisted", blacklisting changes the number of channels used in a particular time slot, referred to as the channel number. IEEE 802.15.4e defines default FHSs for each channel number. The default FHSs are designed to provide a small probability of interference between interfering links. In the default setting of IEEE 802.15.4e, devices regenerate a new FHS when the channel blacklist is updated. However, generating a new FHS requires processing resources of the network devices general proportional to the FHS length L, and thus generating long FHSs is costly in terms of device processing bandwidth, power consumption and device memory utilization. At the same time, large FHS lengths L are better for ensuring randomness (e.g., L=511 in the default FHS), and thus reducing the probability of collisions and corresponding packet retransmissions.

SUMMARY

Disclosed examples include a network device and a wireless communication method in which the device generates a sequence y(j), which is for generating FHS, having a sequence length p using cyclotomic classes in a field of p, where p is an odd prime number, $y(0)=p-1$ and the remaining sequence values $y(j)=\log_\alpha(j) \mod (p-1)$ for $1 > j > p-1$. In certain examples, $\alpha=2$ and the sequence is generated using an algorithm without logarithms, multiplications or modulo operations to reduce processing complexity. Further disclosed network devices and methods generate the sequence using a baby-step giant-step algorithm to further facilitate reduction in computation complexity and memory requirements.

DETAILED DESCRIPTION

Figure 1:
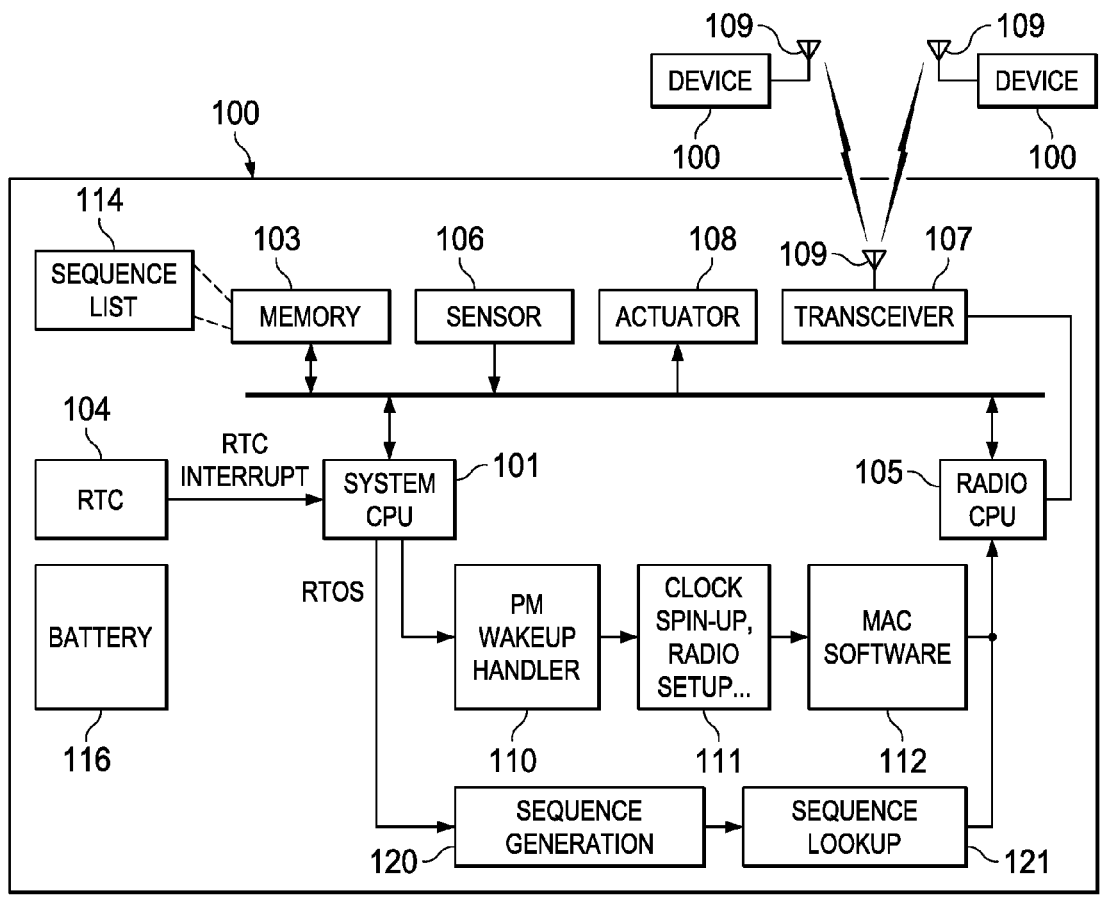
FIG. 1 is a diagram of an example wireless network with a network device including a transceiver, a memory and one or more processors to implement wireless time slotted channel hopping communications with channel blacklisting and to generate a FHS.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to..." Frequency hopping sequence generation techniques and wireless network devices are described to facilitate TSCH communications among devices in a wireless network using blacklisting, although the described examples can be used in a variety of different communications applications. In particular, battery-operated wireless sensor devices have limited processing capabilities and memory, and power consumption is a concern. At the same time, energy conservation is facilitated by mitigation of interference and the associated retransmission of packets between devices. Frequency hopping in combination with blacklisting of frequency channels known or suspected to be subject to interference facilitates reduced power consumption of the network devices. However, the FHS in the individual network devices thus be updated when the list of good channels is updated, and extensive and/or complex FHS generation processing may exceed the processing and/or memory storage capabilities of a low-power wireless sensor, and will increase device power consumption.

FIG. 1 illustrates an example TSCH network device 100 including a transceiver 107 operatively coupled via an antenna 109 with a wireless network to transmit or receive data to or from one or more other network devices 100 via a plurality of frequency channels. The device 100 includes an electronic memory 103 and one or more processors 101, 105 to implement wireless communications functions in the network, and to implement frequency hopping as well as sequence generation and sequence lookup functions 120 and 121 for generating FHS. In particular, the electronic memory 103 stores a sequence list 114 representing a generated sequence, and the memory 103 stores a good channel list (e.g., list 602 in FIG. 6 below) including entries indicating currently usable frequency channels (e.g., "good channels") of the wireless network. The illustrated device 100 includes a battery 116 providing power to the processors 101, 105 and the other components in the device 100. In certain examples, moreover, the device 100 can be a low power sensor including one or more sensors 106 and/or one or more actuators 108, although not required for all embodiments of the presently disclosed concepts. Disclosed examples include devices 100 and methods for FHS generation upon initial device startup and/or in response to updates to a good channel list for blacklisting implementations to facilitate adequate frequency hopping sequence randomness to achieve low interference probability in network operation, while mitigating or reducing processing resource and memory utilization in the network device, thereby reducing power consumption.

Any suitable processor or processors can be used to implement the sequence generation and sequence lookup functions 120 and 121 as described herein. In particular, a processor may include programmed or programmable circuits, and/or fixed logic circuits, or combinations thereof. In this regard, FIG. 1 illustrates various functions shown as blocks, including items 110, 111, 112, 120 and 121 in FIG. 1, which can be individually or in combination implemented by a programmed or programmable processor 101, logic circuits, or combinations thereof. In certain examples, moreover, the memory 103 constitutes a computer-readable storage medium that stores computer-executable instructions that, when executed by the processor 101, perform the various features and functions detailed herein.

The device 100 in FIG. 1 includes a system processor (CPU) 101 that may include internal electronic memory to store processor-executable instructions and data. In certain examples, a separate electronic memory 103 is provided. The processor 101 and the electronic memory 103 are operatively coupled with one another to allow the processor 101 to obtain and execute instructions stored in the memory 103 and to store data to the memory 103. In one example, the electronic memory 103 is a nonvolatile memory that stores software program instructions that may be executed by CPU 101 and/or by a radio processor (CPU) 105 to perform some or all of the network functions described herein. In one example, functions 110-112 and 120-121 are implemented by program instructions stored in the memory 103 and executed by the CPU 101 of the device 100. The radio CPU 105 in the illustrated example is operatively coupled to the system processor 101, and the CPU 105 is configured to control the transceiver 107 to transmit and receive data via the network using a wireless TSCH protocol. In one example, the device 100 is implemented using a CC26xx SimpleLink™ Multistandard Wireless MCU integrated circuit (IC) available from Texas Instruments. The device 100 in this example also includes a real time clock (RTC) 104 that generates and provides periodic interrupts to the processor 101. In one example, a device wakeup is initiated by an RTC interrupt, and the processor 101 implements a RTC interrupt handler and passes control to a power management (PM) wakeup handler 110. The PM wakeup handler 110 in one example performs state transition steps 111 such as clock spin, radio setup and so on, after which the processor 101 executes media access control (MAC) software 112 to issue commands (e.g., transmit, receive, idle) and otherwise control the radio CPU 105. These features facilitate low power operation of the device 100, particularly for low power battery-operated sensor devices 100 which can enter a low-power "sleep" mode to conserve battery power, and can then wake up to perform sensing as well as transmission or reception functions via the wireless network as needed.

The processor 101 implements the sequence generation logic 120 to initially generate a sequence list 114 in the memory 103, such as when device 100 joins a network, and the stored sequence list 114 is thereafter used by the sequence lookup functions 121 implemented by the processor 101 to determine a channel or frequency for transmission or reception of data via the wireless network in a given timeslot. In certain examples, an initial sequence 114 is installed in the memory 203 during production of the device 100. The processor 101 also implements the sequence lookup functions 121 when transmitting or receiving. For example, certain channels of the wireless network may be determined to be unsuitable for use, and the device 100 can be notified by a wireless communications to update its internal good channel list (e.g., good channel list 602 in FIG. 6 below). In another example, a previously suspected bad channel can be determined to be now suitable for wireless communications between the devices 100, and the device 100 can be notified to update the good channel list 602 in response. Updates to the good channel list in certain examples do not cause the processor 101 to implement the sequence generation functions 120 again, the function implemented in sequence lookup 121 will directly change the frequency selection results by utilizing the new good channel list. In some embodiments, just a portion of the sequence 114 is stored in the memory 103 if the memory, for example, where the memory 103 of the device 100 does not include enough capacity to store the entire sequence 114. In this case, the remainder of the sequence 114 may be calculated on the fly when needed to perform a sequence lookup. As used herein, storage of a sequence in the electronic memory 103 means storing all or at least a portion of a sequence in the memory 103.

As previously mentioned, the length L of a particular FHS influences the amount of randomness in the frequency hopping operation, and thus affects the interference probability of the resulting operation of the wireless network. In operation, a supervisory or host node in the network can assign and offset value "Offset" to individual devices 100 that join the wireless network, and the individual devices 100 use this offset as well as other parameters to perform a sequence lookup function 121 using the device processor 101 in a given timeslot, in order to determine or select a particular frequency channel for use by the transceiver 107 in that timeslot. The sequence lookup function 121, moreover, uses the sequence list 114 stored in the memory 103. If the entire sequence 114 is saved, the required memory is O(L), and the initial computation complexity of sequence generation 120 is O(L), indicating that the memory and computation resource requirements are proportional to the length of the sequence 114. In one example, the processor 101 implements the sequence lookup logic 121 each time the device 100 needs to transmit or receive in order to select a channel for use by radio CPU 105 in a frequency hopping or channel hopping fashion.

Figure 2:
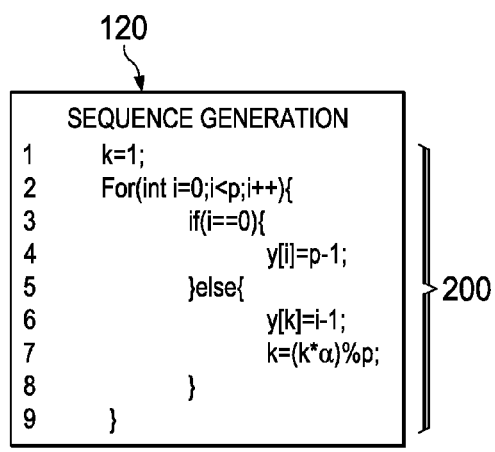
FIG. 2 is a diagram of a first algorithm used by one example of the device of FIG. 1 to generate a sequence, which is used to generate FHS.
Figure 3:
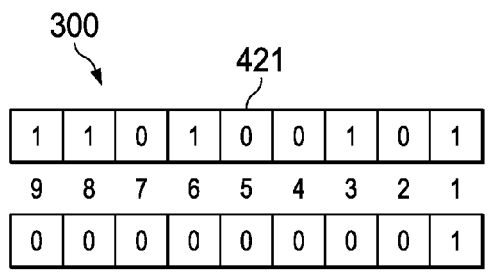
FIG. 3 is a diagram showing a bit-wise representation of the algorithm in FIG. 4 with an example sequence with length of 421.
Figure 4:
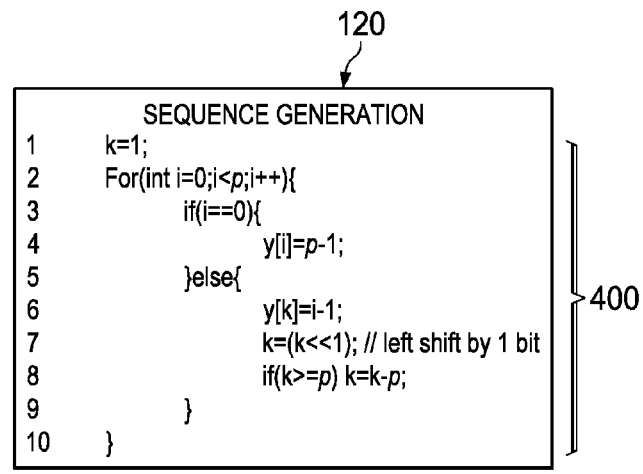
FIG. 4 is a diagram of a second algorithm used by another example of the device of FIG. 1 to generate the sequence.
Figure 5:
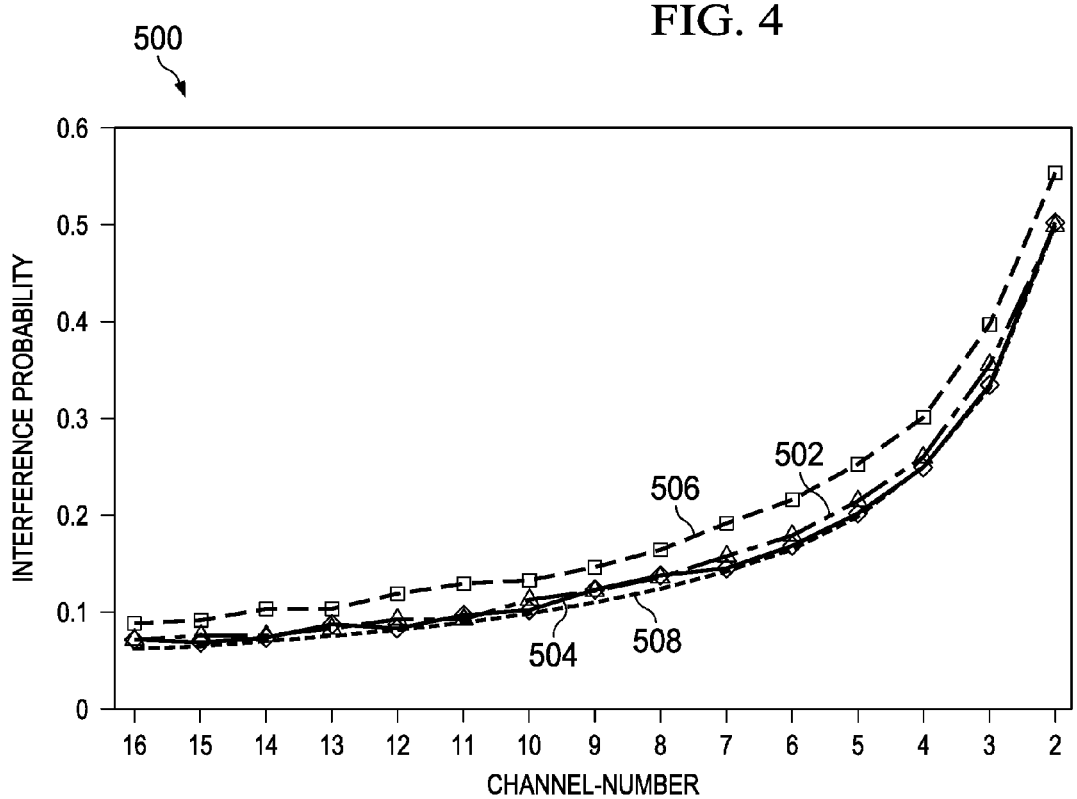
FIG. 5 is a graph of interference probability in the wireless network.

Referring also to FIGS. 2-6, FIG. 6 shows further details of an initial or subsequent sequence generation and sequence lookup operation in the device 100 of FIG. 1. FIGS. 2 and 4 illustrate first and second algorithms 200 and 400, respectively, used by certain examples of the processor 101 to generate the sequence using cyclotomic classes in a field GF(p) of the FHS sequence length "p", where p is an odd prime number. FIG. 3 shows a bit-wise representation 300 of an example of sequence generation 400 with a sequence length of prime number 421 (p=421). FIG. 5 provides a graph 500 showing simulated interference probabilities in the wireless network for two example cyclotomic class-generated FHS sequences 114 502 and 504, as well as a default IEEE 802.15.4e sequence 506 and an optimal FHS 508.

Figure 6:
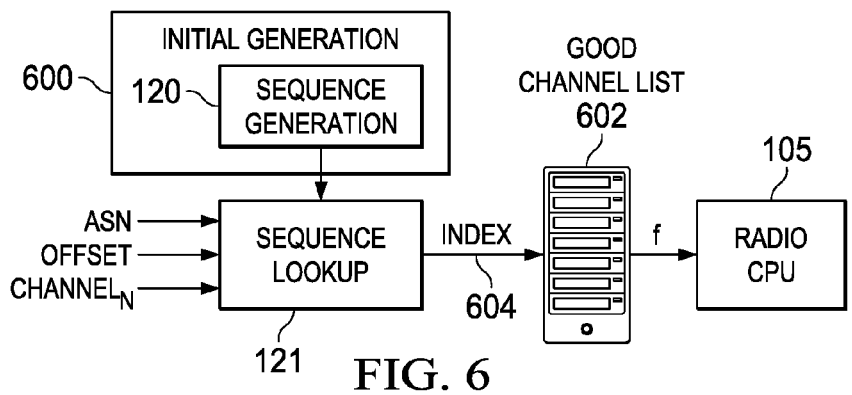
FIG. 6 is a diagram of further details of an initial sequence generation and sequence lookup operation in the device of FIG. 1 for generating FHS.

As seen in FIG. 6, the processor 101 implements an initial generation component 600 including the sequence generation function 120 to provide the FHS 114 for storage in the electronic memory 103 (FIG. 1). The processor 101 implements the sequence lookup function 121 for a given timeslot according to the stored sequence 114 and generates an index 604 to the good channel list 602 (stored in the memory 103 in one example). The indexing into the good channel list 602 provides a selected channel frequency "f" for use by the radio CPU 105 to transmit and/or receive data to or from the wireless network via the transceiver 107 and the antenna in FIG. 1. The initial sequence 114 is generated initially without the knowledge of the channel number $Channel_N$ (i.e., the number of good or operational frequency channels in the wireless network). Once generated, when the device 100 needs to transmit or receive data via the network, the processor 101 implements the sequence lookup function 121 to generate the channel index 604 according to the value in the sequence 114, the current channel number $Channel_N$, a current Absolute Slot Number (ASN) indicating a current timeslot for a time-slotted channel hopping (TSCH) communications protocol, and according to a Channel-Offset (Offset) that is assigned to the particular device 100. In one example, the processor 101 uses the following equation (1) to compute the channel index 604:

$$Index = (Sequence[(ASN+Offset)\% p])\% Channel_N \quad (1)$$

where "%" indicates a modulo operation, and p is the sequence length of the sequence 114.

In certain examples, the ASN value is an integer that represents the current time slot number, which is used for synchronization, and the Offset value is assigned to the device/devices 100 by a root node of the wireless network (not shown). In practice in one example, the value Offset is used by a root node to mitigate collisions between interfering links by assigning different offset values to such links. The sequence lookup feature 121 advantageously allows operation of the low power sensor devices 100 in a series of timeslots using channel or frequency hopping in combination with blacklisting via the good channel list 602 without having to regenerate a new FHS each time the channel number $Channel_N$ changes.

Disclosed examples include devices 100 which generate a sequence 114, which can generate FHS with low interference probability according to a Lempel-Greenberger bound when the channel numbers satisfy certain conditions, and can facilitate lower interference probability performance compared with default FHSs for all channel-numbers. In addition, the device 100 generates the sequence 114 with low computation complexity, reduced memory requirements, and reduced power consumption. The device 100 generates FHSs with different channel numbers $Channel_N$ using only one initially generated sequence 114. It is possible to generate optimal FHSs (i.e., FHSs having optimal interfering probability) for each $Channel_N$ individually using different sequences, but it is hard to generate optimal FHSs for different channel-numbers using only 1 sequence 114. Generating optimal FHSs for each $Channel_N$ using multiple sequences causes large overhead both in memory and computation, which is not suitable for 802.15.4 networks.

In one example of the device 100, the processor 101 is configured by programming instructions stored in the memory 103 to generate the sequence 114 ($Y=\{y(j)\}$) of a sequence length p using cyclotomic classes in the field (GF(p)), wherein p is an odd prime number, and wherein $0 \leq j < p$. The processor 101 stores the sequence 114 in the memory 103, and uses the sequence 114 and one or more timeslots for transmitting or receiving data via the wireless network. As previously discussed, the processor 101 generates an index value 604 (FIG. 6) in a given timeslot according to the current channel number $Channel_N$, the current absolute slot number (ASN), and the channel offset value Offset assigned to the device 100. Using the channel index value 604, the processor 101 determines or selects one of the currently usable frequency channels indicated by the index value 604 using the good channel list 602 and the index 604. With the selected channel from the good channel list 602, the processor 101 causes the transceiver 107 to transmit data to, or receive data from, the wireless network in the given timeslot using the selected channel. In certain implementations, as shown in FIG. 1, the selected channel may be provided to the radio processor (CPU) 105 to interact with the transceiver 107, although a single processor can perform all the above functions and other implementations.

In one example, the processor 101 generates the sequence 114 $Y=\{y(j)\}$, for $0 \leq j < p$, using cyclotomic classes in GF(p), where the sequence length p is an odd prime. For $p=ef+1$, indicating that $e|p-1$, the cyclotomic classes in the field GF(p) of p, $0 \leq i \leq e-1$ are $c_i = \{\alpha^{i+te} | 0 \leq t \leq f-1\}$, where a is a primitive element of the field GF(p). The processor 101 in certain examples is configured to generate the sequence 114 $Y=\{y(j)\}$ with a sequence length p using the following equation (2):

$$supp_Y(i) = C_i \cup \{0\}, i=(p-1) \bmod e$$

$$supp_Y(i) C_i, 0 \leq i \leq e-1, i \neq (p-1) \bmod e \quad (2)$$

where $supp_Y(i) = \{t | y(t)-i, 0 \leq t \leq p-1\}$.

The sequence Y can be equivalently defined according to the following equation (3):

$$y(0)=(p-1) \bmod e$$

$$y(j)=\log_\alpha(j) \bmod e, 0 < j < p \quad (3)$$

where $y(j)-\log_\alpha(j) \leftarrow$ equivalent to $\rightarrow \alpha^{y(j)}-j \bmod p$.

For $e=p-1$, the processor 101 generates the sequence 114 $Y=\{y(j)\}$ according to the following relationships set forth in equation (4) below:

$$y(0)=p-1$$

$$y(j)=\log_\alpha(j) \bmod (p-1), 0 < j < p \quad (4)$$

The above relationships of the equation (4) in certain examples can generate optimal/near optimal FHSs when the channel number $Channel_N$ can divide p−1. For example, using a sequence length p=421, the resulting sequence 114 is optimal/near optimal for channel numbers $Channel_N$ equal to 2, 3, 4, 5, 6, 7, 10, 12, 14, and 15 for a typical case of a maximum number 16 channels. Thus, for a large majority of the possible channel numbers $Channel_N$, the processor 101 very good immunity against interference (e.g., low interference probability). In addition, for cases where the channel number $Channel_N$ cannot divide p−1 ((e.g., $Channel_N$=8, 9, 11, 13, or 16), the interfering probability is smaller than that of the default FHSs. Thus, the processor 101 advantageously provides very good interference avoidance by generating the FHS using the sequence 114 according to the relationships in equation (4).

In one example, the processor 101 generates a sequence 114 Y using p=421 and α=2 using equation (4), as seen in the equation below:

$$y(0)=420$$

$$y(j)=\log_2(j)\mathrm{mod}(420),\ 0<j<421$$

where $y(j)=\log_2(j) \leftarrow$ equivalent to $\rightarrow 2^{y(j)}=j$ mod 421.

FIG. 2 shows a first algorithm 200 used by one example of the device of FIG. 1 to generate the sequence, in which "%" indicates a modulo operation. In this example, the processor 101 is configured to generate the sequence 114 Y={yj} using the algorithm 200 without solving any logarithms. As seen above, the direct evaluation of the relationships in equation (4) would require complex processor-executed instructions to evaluate the logarithm for 0≤j<p. By instead using the algorithm 200 in FIG. 2, no logarithmic operations need to be evaluated by the processor 101, thus saving processing resources in the device 100. It is noted that because the algorithm 200 and FIG. 2 uses multiplication to avoid the heavy computation penalty of solving logarithms, the number generated is not in order of the channel index 604, and the number is recorded in the special order as indicated in Algorithm 200 in one example.

Referring also to FIGS. 3 and 4, the algorithm 200 and FIG. 2 requires that the processor 101 perform p multiplication operations to multiply a by the modulo of p, where p=L is the length of the sequence 114. An algorithm 400 in FIG. 4 further avoids both multiplication and modulo computations by the processor 101, which are generally expensive in terms of processing resources and the device 100. Accordingly, in another example, the processor 101 generates the sequence 114 using the algorithm 400 of FIG. 4. This example also avoids logarithm operations like the algorithm 200 of FIG. 2. In addition, execution of the algorithm 400 for α=2 generates the FHS 114 without solving any multiplications, and without any subtractions for certain values of p. In this regard, execution of the algorithm 400 for α=2 generates the sequence 114 without solving any multiplications, where the processor 101 can instead performed shift operations, as shown in line 7 of the algorithm 400. In one example, the processor 101 avoids these expensive computations by using α=2. Moreover, since α=2, modulo operations can be avoided, and the processor 101 can instead perform subtractions, which are much less costly in terms of processing resources and the device 100. Accordingly, the processor 101 and this example further facilitates low-power sensor devices 100 and power conservation generally in network devices 100, while facilitating computation of optimal/near optimal frequency hopping sequences from the sequence 114.

FIG. 3 shows a bit-wise representation 300 of an example with a sequence length of 421. Because the processor 101 performs binary or Boolean operations, the multiplication of α=2 is equivalent to a simple left shifting operation. In addition, since we only multiply by 2 and the original number in the algorithm 400 is less than p, the modulo of p operation in the relationships of equation (4) above is equivalent to subtracting p if the results is larger than p, as seen in line 8 of the algorithm 400 and FIG. 4. Thus, the generation of the proposed sequence 114 Y is computational efficient when we choose α=2. FIG. 3 shows the bitwise representation of 421 and Algorithm 2 shows the refined algorithm with low complexity (i.e., replace the heavy operations with shifting and subtraction.)

FIG. 5 shows a graph 500 of interference probabilities (derived by hamming auto-correlation) for the device 100 operating in a wireless network with other similar devices 100 using channel index values 604 generated using equation (1) for channel numbers $Channel_N$ from 2 through 16 in the wireless network. The graph 500 illustrates example cases 502 and 504 generated using algorithm 200 or algorithm 400 in FIGS. 2 and 4. In this example, the processor 101 generates sequences 114 for α=2, for p=421 (interference probability curve 502) and for p=419 (probability curve 504). For comparison, FIG. 5 further illustrates an optimal probability curve 508, as well as a default curve 506. As seen in the graph 500 of FIG. 5, the FHS generated using sequences 114 generated by the processor 101 ensure uniform distribution among all good channels indicated by the good channel list 602 (FIG. 6) and the probability curve 502 and 504 achieve optimal/near optimal hamming auto-correlation (i.e., optimal/near optimal (low) interfering probability) when channel-number can divide p-1.(e.g., when p=421 and $Channel_N$=2, 3, 4, 5, 6, 7, 10, 12, 14, or 15). As seen in FIG. 5, the processor-generated FHS generated using sequences 114 have lower interfering probability than the default FHS when the $Channel_N$ cannot divide p−1, and have optimal/near optimal interfering probability when the $Channel_N$ can divide p−1. The disclosed examples thus provide an efficient system and method to generate optimal/near optimal FHSs using sequence 114. The device 100 thus provides advantages for TSCH protocol communications with blacklisting for IEEE 802.15.4e and other similar wireless networks for devices 100 in which low energies consumption, and low processor resource utilization and memory requirements are important.

Figure 7:
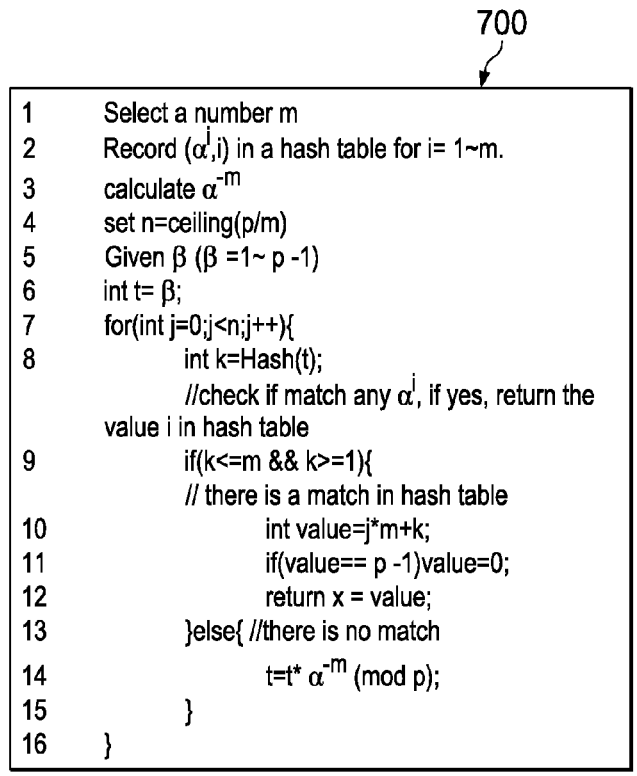
FIG. 7 is a diagram of a third algorithm used in another example of the device of FIG. 1 to generate the sequence.
Figure 8:
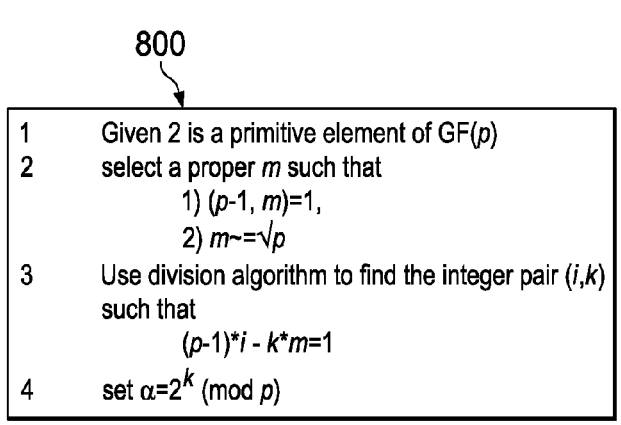
FIG. 8 is a diagram of a fourth algorithm used to select parameters of the third algorithm of FIG. 7.

Referring now to FIGS. 7 and 8, FIG. 7 shows a third algorithm 700 which can be used to generate the FHS 114 in another example of the device 100 of FIG. 1, and FIG. 8 shows a fourth algorithm 800 which can be used to select parameters to implement the algorithm 700 of FIG. 7. In the examples above, the processor 101 in certain examples can use the algorithm 200 and FIG. 2 or the algorithm 400 and FIG. 4 to generate optimal/near optimal FHSs using sequence 114 with initial generation complexity of O(L) and required memory of O(L), where L is the length of the sequence 114 (L=p). The computation complexity is due to the for loop in the algorithm's 200 and 400, and the memory 103 in these examples needs sufficient capacity to store the whole sequence 114.

For applications having memory constrains in the device 100, the algorithm 700 provides enhanced memory efficiency compared to the algorithms 200 and 400 above. In this example, the processor 101 generates the sequence 114 using an example baby-step giant-step algorithm 700 with a complexity of O($\sqrt{p}$) and memory requirement of O($\sqrt{p}$). In these respects, baby-step giant-step algorithms provide improvements over the examples in FIGS. 2 and 4 above in terms of computational resource utilization, as well as memory requirements.

In this regard, the baby-step giant-step algorithm 700 is used to solve a discrete logarithm problem as part of the sequence generation by the processor 101. As seen in equation (4) above, the operand j, and y(j) are discrete values, and the solution of the logarithm and the relationships of equation (4) thus involves a discrete logarithm problem: Given β to represent the sequence index 604, the processor 101 finds x (representing the sequence element y(j)), such that: $\alpha^x=\beta \pmod{p}$, where p is a prime and a is a primitive element of the field GF(p). In the above described example, p=421 and α=2, and the processor 101 implements the algorithm 700 using a hash table in the memory 103. In one example, moreover, the variable "m" is a positive integer less than or equal to the square root of p. In certain examples, m is approximately equal to the square root of the. In this case, the memory complexity of the algorithm 700 is O(m), and computation complexity is O(n). The algorithm 700 also sets a ceiling to the value of m, for example using the variable "n" in line 4 of the algorithm 700 set to $\sqrt{p}$. In this implementation, the memory and computation complexities are generally on the order of $O(\sqrt{p})$, thus representing a significant improvement over the algorithms 200 and 400 discussed above.

As seen in FIG. 7, however, the algorithm 700 involves both multiplication and modulo operations, which are generally expensive in terms of processing resource utilization in the device 100. In particular, the computation of line 14 in the algorithm 700 ($t=t*\alpha^{-m} \pmod{p}$) involves both multiplication and modulo operations. In some examples using α=2, the processor 101 is configured to generate the sequence 114 using the algorithm 700 using shift operations to compute $t*\alpha^{-m}$. In certain examples, moreover, using a ceiling value "n" similar to the value of square root of p (e.g., where m is less than or equal to the square root of p), the processor 101 is configured to generate the sequence 114 via the algorithm 700 using subtraction operations to compute m mod p. For example, using p=421, α=2, m has a ceiling of $\sqrt{p}$=21, $\alpha^{-m}$=329, and the calculation of line 14 becomes $t=t*329 \pmod{421}$. Multiplication by 329 creates a big number, which makes the modulo 421 computation expensive in terms of processing resource utilization, and this computation is repeated n times.

Disclosed examples avoid this expensive computation by selecting suitable values for a and m. For example, selecting $\alpha=2^{23}=261 \pmod{421}$ using and m=23, $\alpha^{-m}=2$, which makes the computation in algorithm 700, line 14: $t=t*\alpha^{-m} \pmod{p}$ very simple. The new calculation of line 14 becomes $t=t*2 \pmod{421}$, which can be implemented by the processor 101 using shifting and subtraction operations, without multiplication or modulo computations.

The algorithm 800 and FIG. 8 can be used to generate or compute suitable values for a and m when 2 is a primitive element of the field GF(p). In certain implementations, a is a primitive element of GF(p) and m is preferably approximately equal to $\sqrt{p}$. Since (p−1, m)=1 (p and m are coprime), there exists an integer pair (i,k) such that (p−1)*i−k*m=1 and (k, p−1)=1 (k and (p−1) are co-prime). Since (k, p−1)=1 and α=2 is a primitive element of GF(p), $\alpha=2^k \pmod{p}$ is a primitive element of GF(p). Thus, the algorithm 800 can be used, for example, in determining values for m and a for storage in the electronic memory 103 and later use by the processor 101 in evaluating the algorithm 700. In certain examples, the algorithm 800 can be implemented by the device processor 101. In other examples, the algorithm 800 can be implemented during production of the device 100, with the resulting values for m and a can be saved in the electronic memory 103.

It is further noted that the hash function of the hash table used for the algorithm 700 may need to perform modulo computations or calculations. In certain examples, the hash function is designed to avoid complex calculations such as divisions or modulo operations, for example, by instead using shifting and bitwise adding to implement "divide by power of 2" and "modulo by power of 2". In one possible example, a hash table of size m=23 can be used. The least small number that is a power of 2 and is larger than m=23 is $2^5$=32. In this example, the algorithm 700 performs a "divide by 32", which can be implemented by a shift operation of 5 bits. In addition, the computation of "modulo by 32" can be implemented using a bitwise addition operation with hexadecimal 0x001f to create a hash function and generate a hash table of size 28.

The disclosed examples baby-step giant-step algorithm 700 facilitate generation of optimal/near optimal FHSs using sequence 114 for all values of the channel number $Channel_N$ with a complexity of $O(\sqrt{p})$ and a memory requirement of $O(\sqrt{p})$, which is a significant advantage compared to the algorithms 200, 400 which have a memory requirement of O(p). The disclosed examples provide efficient methods for implementation by the processor 101 in a network device 100 to generate optimal/near optimal FHSs using sequence 114, and provide attractive low power consumption solutions for battery-powered sensors or other network devices 100 to communicate via TSCH protocols with blacklisting for IEEE 802.15.4e networks and the like which operate in presence of interference.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. A network device, comprising:
   a transceiver operatively coupled with a wireless network to transmit or receive data to or from another network device via a plurality of frequency channels of a wireless network;
   an electronic memory to store a good channel list including entries indicating currently usable frequency channels of the wireless network; and
   a processor to:
      generate a sequence Y={y(j)}, having a sequence length p, using cyclotomic classes in a field, wherein p is an odd prime number, and wherein 0≤j<p,
      store the sequence in the electronic memory,
      generate an index value according to:
         a current channel number,
         a current absolute slot number indicating a current time slot for a time-slotted channel hopping (TSCH) communications protocol, and
         a channel offset value assigned to the network device, and
      determine a selected one of the currently usable frequency channels indicated by the index value using the index value and the good channel list, and
      cause the transceiver to transmit data to the wireless network or receive data from the wireless network in a given timeslot using the selected one of the currently usable frequency channels.

2. The network device of claim 1,
   wherein the processor is configured to generate the sequence Y={y(j)} according to the following relationships:

$y(0)=p-1$, and $y(j)=\log_\alpha(j)\bmod(p-1)$;

wherein $0<j<p$; and
   wherein $\alpha$ is a primitive element of the field of the sequence length p.

3. The network device of claim 2, wherein the processor is configured to generate the sequence Y={y(j)} using an algorithm without solving any logarithms.

4. The network device of claim 3, wherein $\alpha=2$; and wherein the processor is configured to generate the sequence Y={y(j) } using the algorithm without solving any multiplications.

5. The network device of claim 4, wherein the processor is configured to generate the sequence Y={y(j)} using the algorithm without any mod operations.

6. The network device of claim 5,
   wherein the processor is configured to generate the sequence Y={y(j) } using the following algorithm:

```
1  k=1;
2  For(int i=0;i<p;i++){
3      if(i==0){
4          y[i]=p-1;
5      }else{
6          y[k]=i-1;
7          k=(k<<1); // left shift by 1 bit
8          if(k>=p) k=k-p;
9      }
10 }.
```

7. The network device of claim 1, wherein the processor is configured to generate the sequence Y={y(j)} using the algorithm without any modulo operations.

8. The network device of claim 1, wherein the processor is configured to generate the sequence Y={y(j)} using an algorithm without solving any logarithms.

9. The network device of claim 8, wherein $\alpha=2$; and wherein the processor is configured to generate the sequence Y={y(j) } using the algorithm without solving any multiplications.

10. The network device of claim 8, wherein the processor is configured to generate the sequence Y={y(j)} using the algorithm without any modulo operations.

11. The network device of claim 1,
    wherein the processor is configured to generate the sequence Y={y(j)} using the following algorithm:

```
1  k=1;
2  For(int i=0;i<p;i++){
3      if(i==0){
4          y[i]=p-1;
5      }else{
6          y[k]=i-1;
7          k=(k<<1); // left shift by 1 bit
8          if(k>=p) k=k-p;
9      }
10 }.
```

12. The network device of claim 1, wherein the processor is configured to generate the index value Index according to the following formula:

$\text{Index}=(\text{Sequence}[(\text{ASN}+\text{Offset})\%\ p])\ \%\text{Channel}_N$;
   and wherein ASN is the current absolute slot number, Offset is the channel offset value, $\text{Channel}_N$ is the current channel number, and % is a modulo operation.

13. A method of communicating in a wireless network, the method comprising:
    in a network device, generating a sequence Y={y(j)}, having a sequence length p, using cyclotomic classes in a field, wherein p is an odd prime number, and wherein $0 \leq j < p$;
    in the network device, generating an index value according to:
       a current channel number,
       a current absolute slot number indicating a current time slot for a time-slotted channel hopping (TSCH) communications protocol, and
       a channel offset value assigned to the network device;
    in the network device, determining a selected one of a plurality of currently usable frequency channels indicated by the index value using the index value and the good channel list; and
    transferring data between the network device and a wireless network in a given timeslot using the selected usable frequency channel.

14. A network device, comprising:
    a transceiver operatively coupled with a wireless network to transmit or receive data to or from another network device via a plurality of frequency channels of a wireless network;
    an electronic memory to store a good channel list including entries indicating currently usable frequency channels of the wireless network; and
    a processor to:
       generate a sequence Y={y(j)} having a sequence length p, using a baby-step giant-step algorithm, according to the following relationships:

$y(0)=p-1$, and $y(j)=\log_\alpha(j)\bmod(p-1)$, wherein the sequence length p is a prime number, wherein $0<j<p$, and
       wherein $\alpha$ is a primitive element of a field of the sequence length p,
       store the sequence in the electronic memory,
       generate an index value according to:
          a current channel number,
          a current absolute slot number indicating a current time slot for a time-slotted channel hopping (TSCH) communications protocol, and
          a channel offset value assigned to the network device, and
       determine a selected one of the currently usable frequency channels indicated by the index value using the index value and the good channel list, and
       cause the transceiver to transmit data to the wireless network or receive data from the wireless network in a given timeslot using the selected one of the currently usable frequency channels.

15. The network device of claim 14,
    wherein the processor is configured to generate the sequence Y={y(j)} using a hash table stored in the electronic memory and the following algorithm:

```
1  Select a number m
2  Record (α^i,i) in a hash table for i= 1~m.
3  calculate α^-m
4  set n=ceiling(p/m)
5  Given β(β =1~ p -1)
6  int t= β;
7  for(int j=0;j<n;j++){
8      int k=Hash(t);
       //check if match any αi, if yes, return the value i in hash table
9      if(k<=m && k>=1){
       // there is a match in hash table
10         int value=j*m+k;
11         if(value== p -1)value=0;
12         return x = value;
13     }else{ //there is no match
14         t=t*α^-m (mod p);
15     }
16 }; and
wherein m is a positive integer.
```

16. The network device of claim 15, wherein α=2, and wherein the processor is configured to generate the sequence Y={y(j)} using the algorithm using shift operations to compute t* α^{-m}.

17. The network device of claim 16, wherein n is less than or equal to the square root of p;
wherein m is less than or equal to the square root of p; and wherein the processor is configured to generate the sequence Y={y(j)} using the algorithm using subtraction operations to compute m (mod p).

18. The network device of claim 15, wherein n is less than or equal to the square root of p;
wherein m is less than or equal to the square root of p; and wherein the processor is configured to generate the sequence Y={y(j)} using the algorithm using subtraction operations to compute m (mod p).

19. The network device of claim 15, wherein m is approximately equal to the square root of p.

20. A method of communicating in a wireless network, the method comprising:
in a network device, generating a sequence Y={y(j)}, having a sequence length p, using a baby-step giant-step algorithm, according to the following relationships:

$$y(0)=p-1, \text{ and}$$

$$y(j)=\log_\alpha(j) \bmod (p-1),$$

wherein the sequence length p is a prime number, wherein 0<j<p, and wherein α is a primitive element of a field of the sequence length p;
in the network device, generating an index value according to:
a current channel number,
a current absolute slot number indicating a current time slot for a time-slotted channel hopping (TSCH) communications protocol, and
a channel offset value assigned to the network device;
in the network device, determining a selected one of a plurality of currently usable frequency channels indicated by the index value using the index value and the good channel list; and
transferring data between the network device and a wireless network in a given timeslot using the selected usable frequency channel.

* * * * *